United States Patent [19]

Mitchell

[11] 4,052,516
[45] Oct. 4, 1977

[54] PRECOOKED PEANUT-CONTAINING MATERIALS AND PROCESS FOR MAKING THE SAME

[76] Inventor: Jack H. Mitchell, 101 Bradley St., Clemson, S.C. 29631

[21] Appl. No.: 453,615

[22] Filed: Mar. 22, 1974

Related U.S. Application Data

[63] Continuation-in-part of Ser. No. 187,837, Oct. 8, 1971, Pat. No. 3,800,056, which is a continuation-in-part of Ser. No. 839,673, July 7, 1969, Pat. No. 3,689,287.

[51] Int. Cl.² ............................................. A23L 1/36
[52] U.S. Cl. ................................ 426/271; 426/457; 426/546; 426/632
[58] Field of Search ............... 426/142, 144, 145, 148, 426/227, 228, 209, 179, 183, 199, 321, 322, 328, 335, 372, 377, 457, 632, 633, 634, 545, 546, 271

[56] References Cited

U.S. PATENT DOCUMENTS

| | | | |
|---|---|---|---|
| 617,266 | 1/1899 | Watson | 426/632 |
| 1,813,268 | 7/1931 | Bachler | 426/457 X |
| 3,216,830 | 11/1965 | Melnick | 426/633 |
| 3,278,314 | 10/1966 | Colby et al. | 426/209 |
| 3,376,140 | 4/1968 | Ince, Jr. | 426/456 |
| 3,497,535 | 2/1970 | Lennon | 426/546 |
| 3,497,535 | 2/1970 | Lennon | 426/546 |
| 3,580,729 | 5/1971 | Darragh et al. | 426/633 |
| 3,619,207 | 11/1971 | Dzurik et al. | 426/633 X |
| 3,620,755 | 11/1971 | Hoffman | 426/632 |
| 3,628,971 | 12/1971 | Karchmar | 426/328 |
| 3,689,287 | 9/1972 | Mitchell, Jr. | 426/457 |
| 3,723,131 | 3/1973 | Bixby et al. | 426/633 X |
| 3,778,522 | 12/1973 | Strommer | 426/516 |
| 3,800,056 | 3/1974 | Mitchell, Jr. | 426/457 |
| 3,814,823 | 6/1974 | Yang et al. | 426/516 X |
| 3,833,739 | 9/1974 | Pedersen | 426/372 |

OTHER PUBLICATIONS

Peanuts: Produc., Proc., Products, Woodroof, 2nd ed. 1973.
Food Technology, vol. 22, 907, July 1968, pp. 95–97, Mitchell, Jr., et al.
J. Amer. Oil Chemists Soc., Mustakas et al. Sept. 1964.

*Primary Examiner*—Steven L. Weinstein
*Attorney, Agent, or Firm*—Allison C. Collard

[57] ABSTRACT

Process for increasing the shelf life of precooked dehydrated protein and oil containing ingredients for foods by heating an emulsion-suspension of said peanuts to high temperatures and dehydrating the cooked emulsion-suspension, also adjusting the texture of said dehydrated material by processing treatments prior to cooking and dehydration, and the oil-protein ratio by removing part or all of the oil from the peanuts by mechanical means or by extraction, respectively, or by mixing ground peanuts in predetermined amounts with materials poor in fat and rich in proteins. The invention also relates to the precooked dehydrated ingredients so made and the food products containing the same.

14 Claims, No Drawings

PRECOOKED PEANUT-CONTAINING MATERIALS AND PROCESS FOR MAKING THE SAME

This is a continuation-in-part of application Ser. No. 187,837, filed Oct. 8, 1971 now U.S. Pat. No. 3,800,056 which is a CIP of Ser. No. 839,673, filed 7/7/69 now Pat. No. 3,689,287.

The present invention relates to essentially flavorless, precooked, dehydrated peanut food ingredients having extended storage life, and to the processes for producing them. The protein to oil ratio and texture may be varied to meet utilization requirements in formulations of meat analogs, sandwich spreads, confections, breakfast cereals, and other food products.

Almost all of the vegetable protein extenders commercially available are essentially free of oil or fat since the processes by which most of them are prepared require that the oil or fat be removed. To achieve good nutritional quality in the formulation of meat analogs or in the extension of many foods it is necessary, however, that oil or fat be included to achieve the nutritional value which exists in the natural items being extended, or imitated, namely meats, poultry, fish, and cheese. In many areas of the world, there is not only a shortage of protein but of calories as well. In the interests of economy and nutrition it is desirable, when processing oilseeds into basic food ingredients, that methods be found for stabilizing the oil so that all or a portion of it can be retained along with the protein and other components of oilseeds which are important in nutrition, without the oil causing rancidity during storage. Even in those instances where it is preferably to allow only a small percentage of the total oil to remain in the processed oilseed material, it is essential that the remaining oil resist oxidation to prevent development of objectionable flavors caused by oxidation.

Processing conditions described in the prior U.S. Pat. No. 3,689,287, Process for Making Peanut Flakes and the application, U.S. Ser. No. 187,837, by this inventor provide precooked peanut flakes which have applications in formulating many food products which have excellent acceptability when judged by consumer-type taste panels. The process removes compounds responsible for "raw" flavor as well as those responsible for peanut flavor.

The present invention relates to means for further extending the shelf life of dehydrated precooked peanut material containing oil by adding antioxidants and metal complexing agents.

Another factor in addition to storage stability and flavor, which has great influence on the acceptability of food products is texture. It is well known that this quality is important in achieving an attractive appearance and a pleasing "mouth feel." When dehydrated peanut flakes or other materials are used in the formulation of imitation coconut confections, meat spreads, and as extenders in ground meats, a coarse texture may be desired. In casserole recipes, egg omelets, and cheese-flavored dips, a smooth texture is desired. These uses are mentioned as illustrations and do not represent the full range of possibilities. The present invention includes process modifications which provide for producing precooked peanut flakes having either a coarse or a smooth texture.

For maximum utility, food ingredients should have a composition which extends their usefulness to a wide range of food products by adding to their nutritional value. Thus, when the dehydrated peanut material is to be employed in dry breakfast cereals, baked products, or as an extender for ground meat, it is desirable to reduce the oil content and thereby increase the protein content of the precooked peanut material. It is an object of the present invention to provide methods for achieving the above-mentioned result.

The factors which are important in providing high-quality extenders for various food products will be more fully discussed below.

Extension of storage life. Adequate precooking of finely ground peanuts dispersed in water to form a suspension of solids and an emulsion of oil has been found to increase the shelf life of peanut flakes produced from the material (U.S. Pat. 3,689,287 and U.S. Ser. No. 187,837). This may be viewed as an anomaly in view of the fact that peanuts, heat-processed by roasting were rancid and had a peroxide value of 90 meq of peroxide oxygen/kg after four weeks storage at 100° F, while coarsely ground raw peanuts maintained essentially zero peroxide values for at least six months. Oxidation in the complex system in oilseed products is influenced by many varibles, and the reasons for some phenomena observed are not clear. Because of this, several studies were undertaken by this inventor with the objective of obtaining an understanding of the factors responsible for the increase in shelf life of dehydrated peanut material, such as precooked peanut flakes, which results from steaming raw shelled peanuts prior to grinding, and from precooking a suspension of finely ground peanuts in water. Since changes caused by precooking take place very rapidly in the finely ground peanuts when the suspension in water is subjected to heat, it was more feasible to collect data on some of these changes from studies made on whole shelled peanuts. As a result of these studies, the following observations have been made:

First: The rate of oxidation of oil in raw shelled whole peanuts is very slow. The initial effect of moist heat treatment is to increase the rate of oxidation on subsequent storage, but the second effect is to stabilize the oil against oxidation; Table I and Table II.

Second: Lipoxygenase in whole shelled raw peanuts is inactivated by steaming at 212° F in less than two minutes, but peroxidase inactivation requires considerably longer, Table III.

Third: Raw peanuts contain a heat-labile substance which rapidly destroys hydroperoxides in the absence of added water, Table IV.

The inactivation of enzymes in whole shelled peanuts during moist heat treatments also occurs in finely ground peanuts but at a much faster rate because of more efficient heat transfer. Observations made with regard to the effects of heat treatments on lipid stability in whole shelled peanuts and precooked peanut flakes have demonstrated that the shelf life of the latter (and other precooked dehydrated peanut material containing peanut oil) is increased by precooking the finely ground peanut water mixture for periods of time longer than are required to inactivate peroxidase, Tables III and V. The reasons for this are not entirely clear, but during heat inactivation of peroxidase some quantity of the heme moiety of the peroxidase molecule may be converted to a non-enzymatic iron-containing catalyst which promotes autoxidation of lipids. Further heating probably causes changes in protein molecules which result in the formation of small quantities of antioxidant compounds and metal complexing substances. The latter may for complex compounds with non-enzymatic metallic catalysts for lipid oxidation and thus inhibit their prooxidant effect. Reduction in the rate of oxidation of oil in full-fat peanut flakes was not the result of changes in the oil, but is the result of changes in other compounds. This was determined by extracting oil from peanut flakes produced from finely ground peanut-water slurries heated for various time periods prior to drying into flakes. The oils from each sample had essentially the same keeping times in hours when tested by the active oxygen method (AOM).

It has now been found that stabilization by precooking a suspension of finely ground peanuts in water is greatly amplified by the addition of anti-oxidants and synergists (metal complexing agents), and that the addition of these substances extends the shelf life of the precooked dehydrated materials significantly without the necessity of the prolonged precooking times indicated in Table V.

The increase in shelf life of peanut flakes which results from steaming peanut flakes prior to grinding may be attributed to the fact that lipoxygenase is inactivated by this treatment and therefore cannot catalyze the initial formation of hydroperoxides which are known to catalyze autoxidation. It was shown by data included in U.S. Pat. No. 3,689,287 that the antioxidant, butylated hydroxyanisole, was not very effective in retarding oxidation of peanut flakes prepared from a non-precooked suspension of finely ground peanuts in water. It has now been found that anti-oxidants and metal complexing agents extend the shelf life of peanut flakes prepared from precooked suspensions of finely ground peanuts in water. The data in Tables VI and VII were obtained by placing 20 grams of peanut flakes in 4 ounce glass bottles closed with plastic screw caps and storing these bottles at a constant temperature of 100° F. This temperature was used for the purpose of accelerated stability testing, and it is not intended to imply that the flakes should be stored at this temperature in commercial practice, since the higher the temperature the more rapid is the rate of oxidation. The data in Table VII show that tertiary butyl hydroquinone, (TBHQ), butylated hydroxytoluene (BHT), butylated hydroxyanisole (BHA), and propyl gallate are effective in reducing the rate of oxidation in peanut flakes. The metal complexing agents, citric acid and ethylenediamine tetra-acetic acid (EDTA), also delayed oxidation and extended the shelf life of the flakes. It should be understood that the use of anti-oxidants and synergists for extending the shelf life of peanut flakes may not be limited to those cited in Table VII.

The principles which have been elucidated for achieving satisfactory shelf life (more than six months at 100° F) and elimination of flavor, apply to precooked peanut material dehydrated by drum drying, spray drying, belt drying, and other feasible dehydration methods. In practicing the various dehydration methods, it is only necessary to adjust the water content before precooking to achieve the desired increase in consistency, during precooking, best suited for each dehydration method. If only a sufficient amount of water is added to the finely ground peanut material to produce a moisture content of about 33 to 50 percent, the material will congeal to a semisolid which can be formed into a thin stratum, strips or other forms by various means and subsequently dehydrated. If the dehydration method to be used is spray drying, a more fluid product is necessary in the precooked state and, therefore, from about 3 to 6 parts of water is mixed with 1 part by weight of finely ground peanuts prior to precooking.

Adjustment of Texture of Flakes. According to the process described in U.S. Pat. No. 3,689,287, and in application, Ser. No. 187,837, peanuts are dried to a moisture content of about 2 to 6 percent prior to grinding into a smooth paste, consisting of fine particle sizes, which is then dispersed in water. It has now been found that another method of grinding raw peanuts, or steamed peanuts, makes possible the production of peanut material having a texture somewhat more coarse. It also facilitates production operations and saves time since the peanuts, after preliminary coarse grinding, are mixed with enough water to form a thick pumpable slurry which can be ground to the desired fineness by being passed through any suitable mill. We have used a colloid mill equipped with a carborundum surfaced rotor and stator. This is a more rapid procedure than that of grinding the peanuts to a fine paste and then mixing the paste with water to form a smooth suspension and emulsion. It is especially advantageous to use this method for grinding whole blanched shelled peanuts which have been steamed to inactivate lipoxygenase. During steaming, the peanuts absorb moisture, and to practice this method of grinding, it is not necessary to dry the peanuts, thus eliminating the time-consuming drying step after steaming. It is preferable to blanch peanuts prior to steaming since they do not darken during steaming as a result of absorption of pigment from the red skins. Grinding raw peanuts or steamed peanuts in the presence of water disrupts the peanut structure in such a manner that the cellular tissue is torn into minute shreds. Oil, water-soluble protein, and carbohydrate are released and form an emulsion with the water. When the ground peanut material is suspended in water and precooked, prior to drying, the consistency increases as protein coagulates and starch gelatinizes. This entraps the oil and the shredded cellular tissue upon drying. The latter provides a slightly coarse texture in the flakes, which is especially desirable when they are used to extend ground meats, in formulating or extending meat-type spreads, and when they are used as a substitute for ground or grated coconut in certain products. To provide additional texture, heat coagulable substances, such as albumen, were added to the peanut material. Upon dehydration, such substances are coagulated and provide the desired additional textural strength.

When unground or coarsely ground blanched peanuts are precooked in the presence of wter and then further disintegrated by passing them through a suitable mill prior to dehydration, the texture of the flakes is intermediate between flakes obtained by fine grinding and precooking. There are processing advantages in precooking the unground or coarsely ground blanched peanuts with water prior to further disintegration, homogenization and drying. For example, in bath operations, there was no sticking or caking of the product on the walls of the pressure cooking vessel. This method of cooking, however, releases some free oil droplets in the cooking water. One of several types of emulsifiers were found to be helpful in developing a stable emulsion when the precooked material was homogenized in the colloid mill. Mono- and di-glycerides in amounts of about 0.5 to 1.0 percent of the weight of the peanuts were used with good results. These additives were also helpful during drum drying, in forming a dehydrated sheet which could be broken into flakes of coarse consistency. Other emulsifiers, such as polyoxyethylene derivatives of sorbitan fatty acid esters were also used in amounts of about 0.1 to 0.5 percent of the weight of the peanuts.

Adjustment of Shape. To provide dehydrated precooked peanut material in various shapes and sizes, a new technique was developed. It involves mixing finely ground peanuts with a limited amount of water and subjecting this to heat treatment to bring about gellation of starch and coagulation of protein. This forms a product of firm consistency which can be coarsely ground, diced, cut into strips, sliced, or forced through openings in a die. All of these forms may then be dried. For example, finely ground peanuts were combined with water to give a mix consisting of about 33% water. In another embodiment, the mix contained about 50% water. These materials were heated to between 212 and 350° F as they were conveyed in a continuous manner through heat exchangers and forced through openings in a die attached to the heat exchanger or extrusion equipment. Spaghetti, macaroni, and thin sheets were obtained and dried. The sheets were broken into flakes. Some of these forms maintained their shapes upon soaking in water and even when boiled in water for over 15 minutes. Peanuts from which various amounts of oil have been removed may also be used in this technique or a non-fat containing material, such as extracted soy, cottonseed, or peanut flour may be mixed with the finely ground peanuts.

Adjustment of Protein to Oil Ratio. For many food product formulations, it is necessary that the composition of dehydrated precooked peanut material be within specified limits with respect to protein, oil, and carbohydrate. Adjustments in composition may be made by several methods. One of these methods depends upon the removal of a portion or almost all of the oil from the peanuts by mechanical means, such as by hydraulic presses or by expellers prior to processing the peanuts into flakes.

If no oil is removed from peanuts prior to processing, the flakes have an oil content of about 50 percent, and the protein content is about 34 percent. The exact percentages depend upon the variety of peanuts used. When about 50 percent of the oil is removed from peanuts by hydraulic pressure prior to processing them into flakes or other dehydrated forms, the dehydrated material produced has an oil content of about 33 percent and a protein content of about 44.0 percent. If 80 percent of the oil is removed from the peanuts by mechanical means, the dehydrated material has an oil content of about 16.6 percent and a protein content of about 55.0 percent.

Oil may also be removed from the suspension of finely ground peanuts in water by continuous centrifugation or form comminuted peanuts and peanut press cake by solvent extraction.

For adjusting the composition of the precooked dehydrated peanut material, finely ground peanuts may be combined prior to precooking, with other food materials, high in protein and low in oil. In this manner, food ingredients may be prepared having an adjusted protein : oil ratio ranging from 30 to 55% by weight of protein : 10 to 50% by weight of oil (or fat). Materials, such as defatted soy, cottonseed, or peanut flour or protein, wheat or corn flour, potato or rice flour, non-fat milk solids, or starch are suitable for this purpose. These may be used singly or in combinations. In this manner, blends have been prepared to meet desired protein, carbohydrate and oil contents. These examples are not intended to limit the process to the addition of these specific materials. It is desirable to produce peanut flakes, or dehydrated materials, of reduced oil content for applications in breakfast cereals, confections and extenders for meats, poultry, and fish.

Nutrients, such as the amino acids methionine, lysine, and threonine as well as food flavors and colors have been added to the peanut materials prior to drying.

Peanut-cheese flakes have been produced in a manner such that the only detectable flavor is that of cheese. The shelf-life is unusually good. No rancidity develops and peroxide values remain at near zero levels for over six months when this product is stored in glass bottles at 100° F. Flakes with fifteen percent cheddar cheese, dry weight basis, have been used as an extender to double the yield of cheese-flavored egg omelet and scrambled egg. The protein and oil contents of these items prepared with the peanut-cheese flakes are not diminished, thus nutritional qualities are maintained. The cholesterol content per serving is reduced by about fifty percent since peanuts contain no cholesterol. Peanut-cheese flakes containing thirty percent cheese and seventy percent full-fat peanut material have been used to prepare very acceptable spreads for crackers and hors d'oeuvres.

In the following, a number of examples are given to illustrate more fully the various methods by which the peanuts are treated in order to arrive at the desired results of extending the shelf life as well as adjusting the texture and the protein:oil or fat ratio in the final products.

EXAMPLE 1

Blanched raw peanuts were ground to a pasty consistency through a 0.032 inch screen in a Reitz Disentegrator or by passage through a Premier Colloid Mill having carborundum surfaced rotor and stator with clearances set between about 0.004 and 0.016 inch. Other types of grinding equipment may be used. For best results, the moisture content of the peanuts should be about 1 to 6 percent when they are ground in the above-described manner.

Ground Virginia-type peanuts were dispersed in about 2.8 parts of water, but ground Spanish-type peanuts were dispersed in about 3.5 parts of water. The dispersion of peanuts was heated to about 325° F in a scraped surface-type heat exchanger. However, other suitable methods of heating could be used. The temperature remained at 325° to 300° F for about 45 seconds before being cooled to about 200° F. The consistency of the ground peanut dispersion increased from that similar to whole milk to that of a thick custard during the cooking. The cooked material was dried by top feeding it into the space between the revolving drums of an eight-inch laboratory double drum dryer with chrome plated drum surfaces. Other types of dryers, such as single drum dryers, may be used. The space between the drums was set at 0.016 inch, steam pressure in the drums was about 80 to 90 pounds psi, and revolving speed about 1 revolution per 18 to 24 seconds.

EXAMPLE 2 a. The procedure in this run was the same as in Example 1 with the exception that before cooking, butylated hydroxytoluene (BHT) was added as an antioxidant in amounts of about 0.01 to 0.02 percent of the ground peanuts; it was evenyl distributed in the peanut material. A synergist such as ethylenediamine tetraacetic acid or citric acid in amounts of about 0.01 to 0.02 percent of the peanut material was added in some cases. It is best to add these materials to the peanut paste before dispersing it in water; but other methods may be used provided the additives are evenly distributed throughout the dispersion of ground peanuts in water.

b. The procedure was the same as in example 2a, but instead of BHT, butylated hydroxyanisole (BHA) was added and evenly distributed in the peanut material.

c. The procedure was the same as in example 2a, but instead of BHT, tertiary butyl hydroquinone (TBHQ) was added and distributed in the peanut material.

d. The procedure was the same as in example 2a, but instead of BHT, propyl gallate was added and evenly distributed in the peanut material.

EXAMPLE 3

This procedure was the same as Example 1 with the exception that the dispersion of ground peanuts in water was heated to a temperature between about 212° and 325° F, and maintained at a temperature of about 212° to 250° F for from about 5 to 30 minutes. The lower the temperature, the longer the holding time required, and the higher the temperature attained the shorter the holding time required. The time temperature relationships were such that the oil was stabilized against oxidation as determined by accelerated storage stability tests at 100° F during which the rate of oxidation of the oil was measured by periodic determinations of the peroxide number. Twenty grams of flakes were placed in glass bottles and closed with plastic screw caps. If no rancidity could be detected by taste or odor after six months at 100° F, shelf life was considered satisfactory. As has been stated previously, the proteins coagulated and the starch gelatinized during this heat treatment and, as a result, the consistency increased. Upon dehydration, the oil was absorbed on and entrapped within a matrix consisting of the precooked proteins and carbohydrate substances, and was thus protected to some extent from the oxygen of the atmosphere. This also contributed to the desired length of storage life.

EXAMPLE 4

This procedure is the same as in Example 3 with the exception that the antioxidants and the synergists listed in Example 2 were added to the ground peanut material. Antioxidants without synergists are effective in extending the shelf life, and synergists (metal complexing agents) without antioxidants were also effective to some extent but maximum protection was achieved by using both together.

EXAMPLE 5

Six hundred grams of blanched Spanish-type peanuts were coarsely ground by being passed through ⅛ inch holes in a food chopper. The coarsely ground peanuts were mixed without about 800 grams of water to make a slurry of thick but pumpable consistency. The slurry was passed into a colloid mill equipped with carborundum surfaces on the rotor and stator which were set to provide a distance of about 0.006 inch between them. After passage through the mill, 1300 grams of additional water was stirred into the colloid-milled slurry to achieve a peanut to water ratio of 1 to 3.5. The slurry was then passed through the colloid mill for the second time to accomplish mixing and homogenization. The material was precooked and dried according to procedures outlined in Examples 1 and 3.

EXAMPLE 6

This procedure was the same as described in Example 5 with the exception that antioxidants and synergists named in Example 2 were added to the peanuts after they had been coarsely ground.

EXAMPLE 7

Five hundred grams of blanched Virginia type peanuts were steamed at 212° F for from 2 to 15 minutes to inactivate lipoxygenase. They were then coarsely ground by being passed through ⅛ inch holes in a food chopper. The coarsely ground peanuts were mixed with about 700 grams of water to make a slurry of thick but pumpable consistency. The slurry was passed into a colloid mill equipped with carborundum surfaces on the rotor and stator which were set to provide a distance of about 0.006 inch between them. After passage through the mill, 600 grams additional water was stirred into the colloid-milled slurry which was passed through the colloid mill again to achieve thorough mixing and homogenization. Since the peanuts containing about 20 percent moisture after steaming, the final peanut to water ratio was about 1 to 2.8. The material was precooked and dried according to procedure outlined in Examples 1 or 3.

EXAMPLE 8

This procedure was the same as described in Example 7 with the exception that antioxidants and synergists named in Example 2 were added to the peanuts after they had been coarsely ground.

EXAMPLE 9

Blanched peanuts of about 2 to 6 percent moisture were subjected to hydraulic pressure to remove some of the oil. The quantity of oil removed by this means is a function of the pressure force applied over a given time period, and it was thus possible to control the percent of oil which remained in the peanuts. When it is desired to remove about 80 percent of the oil, a pressure of about 5000 pounds per square inch is applied for about 15 minutes. As much as 96 percent is removed if sufficiently high pressures are applied. When it is desired to remove only 50 percent of the oil, a pressure of about 500 pounds per square inch is applied for 15 minutes.

Two thousand grams of raw blanched peanuts from which about 50 percent of the oil had been removed by hydraulic pressure were ground through ⅛ inch holes in a food chopper. The coarsely ground material was mixed with about 3000 grams of water to form but pumpable slurry which was ground to a homogenous consistency by passing it through a colloid mill equipped with carborundum grinding surfaces on the rotor and stator. If too much water is added to the coarsely ground peanuts it is difficult to maintain an even distribution of water and peanuts through the mill. The space between the rotor and stator was set at about 0.006 inch. An additional 6000 grams of water was added to the material after it had passed through the mill to achieve a 1 to 4.5 ratio of peanuts to water. (This is a greater amount of water than is used with full-fat peanuts. The consistency of the full-fat material does not increase as much as the consistency of the partially defatted material upon precooking). After addition of the final portion of water, the material was again passed through the colloid mill and then precooked, prior to drying as described in Examples 1 and 3.

EXAMPLE 10

This procedure was the same as described in Example 9 with the exception that the antioxidants and synergists named in Example 2 were added to the peanuts after they had been coarsely ground.

EXAMPLE 11

This procedure was the same as described in Example 8 with the exception that the pressed peanuts were steamed to inactivate lipoxygenase prior to grinding. By this inactivation the tendency of the product to becoming rancid is further counteracted.

EXAMPLE 12

Five hundred grams of balanced raw peanuts were placed in a pressure cooker and 1400 grams of water were added. The top was clamped on and the thermostat set to provide a pressure between 10 and 15 pounds per square inch. Cooking was continued for about 30 minutes, or until the peanuts were soft throughout and could be mashed to a pulp between the fingers. Following the cooking, some free oil was observed in the cooking water. Emulsifiers of the monoor diglyceride class, in amounts of about 2.5 grams, were added and incorporated into the cooked peanuts and water by passing the entire mixture through a coarse sieve and then through a colloid mill. The latter was fitted with a carborundum surfaced rotor and stator with clearances set at 0.006 to 0.010 inch. The homogenized material was drum dried.

EXAMPLE 13

The procedure was the same as described in Example 12 with the exception that about 0.5 to 1.0 gram of emulsifiers of the class belonging to the polyoxyethylene derivatives of sorbitan fatty acid esters were used.

EXAMPLE 14

The procedure was the same as described in Examples 12 and 13 except that the antioxidants and synergists named in Example 2 were incorporated along with the emulsifier.

EXAMPLE 15

The procedure was the same as described in Examples 12, 13 and 14 except that the peanuts were coarsely ground and cooked by passing them through a swept surface heat exchanger as described in Examples 1 and 3. After cooking, the peanut particles were reduced to fine particle sizes and the oil was emulsified by passing the material through a colloid mill equipped with carborundum surfaced rotor and stator adjusted to provide clearance of from about 0.006 to 0.010 inch between them.

EXAMPLE 16

Six thousand grams of raw blanched peanuts which had been passed through a colloid mill equipped with carborundum surfaced rotor and stator set to provide about 0.006 inch clearance were mixed with 0.60 gram of butylated hydroxytoluene (BHT) and 0.60 gram of ethylenediamine tetraacetic (EDTA), and the entire peanut material was dispersed in 25 liters of water. It was conveyed through a series of scraped surface heat exchangers at the rate of 56 pounds per hour. The temperature of the material at the exit from the final heating unit was 320° F; it entered the cooling unit 45 seconds later at 285° F. and emerged at 170° F. The material was then spray dried in a laboratory size spray dryer. Inlet air temperature in the spray dryer was about 300° F and outlet exhaust air temperature was about 170° F.

EXAMPLE 17

Six thousand grams of raw blanched peanuts from which 50 percent of the oil had been removed by hydraulic pressure were coarsely ground through ⅜ inch holes in the plate of a food chopper and mixed with 9 liters of water. This material was then passed into a colloid mill equipped with a carborundum surfaced rotor and stator. Clearance between the two was set at about 0.006 inch. An additional 18 liters of water was combined with the material which was then pumped through a scraped surface heat exchanger at the rate of 56 pounds per hour. The peanut material at the exit from the heat exchanger was 285° F and it entered the scraped surface cooler 45 seconds later at 250° F and emerged at 160° F. The material was then spray dried in a laboratory size spray dryer. Inlet air temperature of the spray dryer was from 280° to 300° F and outlet exhaust air temperature was about 160° F.

EXAMPLE 18

The procedure used in this example is the same as described in Example 17 with the exception that defatted peanut flour prepared by hexane extraction of thinly sliced raw peanuts was combined with 5.5 to 7 parts of water, by weight, prior to precooking. Dehydration was accomplished by drum drying or by spray drying.

EXAMPLE 19

One part finely ground raw blanched peanuts were combined with ⅜ to ½ parts of water by weight. One hundredth of one percent of tertiary butyl hydroquinone (TBHQ) and 0.01 percent ethylenediamine tetraacetic acid were added and the material was heated to between 220° and 350° F in a swept surface heat exchanger. It was formed into a thin stratum or thin strips or particulate forms by being passed through openings in a die and was then dehydrated.

EXAMPLE 20

One part defatted peanut flour prepared by hexane extraction of thinly sliced raw peanuts was combined with about an equal quantity of water by weight. This material was heated to between 220° and 350° F in a swept surface heat exchanger and formed into a thin stratum or ribbon strips or particulate forms by being passed through openings in a die. It was then dehydrated.

EXAMPLE 21

Cheese flavored precooked peanut flakes were prepared in the following amanner. Raw blanched peanuts of 1 to 6 percent moisture from which essentially all of the hearts (epicotyl and hypocotyl) had been removed were ground to a fine particle size in a colloid mill with carborundum surfaces on the rotor and stator which were adjusted to provide a clearance of from about 0.006 to 0.010 inch. The finely ground peanuts were dispersed in about 2.8 parts by weight of water and heated to between 212° and 225° F for about 20 minutes. One thousand grams of this cooked material was combined thoroughly with 45 grams of spray dried chedder cheese powder and 12 grams of salt and drum dried. The flakes produced contained about 15 percent cheese, on a dry weight basis. When it was desired to produce flakes containing 30 percent cheese, dry weight basis, 115 grams of spray dried cheddar cheese was combined with 1000 grams of the cooked peanut material.

EXAMPLE 22

The procedure used in this example is the same as described in Example 5 with the exception that after cooking, the peanut - water slurry was cooled to room temperature and dehydrated egg albumen in an amount of 3 to 5% by weight of the ground peanuts was added and incorporated thoroughly. The material was then drum dried. In another version of this idea, sucrose in an amount of about 10% by weight of the ground peanuts was also added to the peanut water slurry. The addition of sucrose may be made before cooking the slurry. Either albumen or sucrose when added to the peanut-water slurry provides a crisp texture in the dehydrated flakes, and the addition of sucrose results in a sweet taste. Other materials such as certain starches may also be used to provide an increase in crisp texture of the dehydrated flakes.

EXAMPLE 23

Raw shelled peanuts were subjected to a pressure of about 500 pounds per square inch for about 15 minutes or until about 50% of the oil was removed from the peanuts. The pressed peanuts, which contained about 30% oil, were ground or passed between rollers to form flat pieces or flakes. The ground partially defatted peanuts or flat peanuts pieces were exposed to steam for about 2 to 5 minutes to raise the temperature of the peanut material to about 95°-212° F and increase the moisture level of the peanuts to about 20%. The peanut material was then conveyed into a screw-type extruder. During a residence time for about 1 to 5 minutes in the extruder, the temperature of the peanut material attained a temperature of from about 230° to 300° F. The extruded material was dryed to a moisture level between about 2.0 and 5.0% and was ground into a flour. In variations of this process, the oil content of the peanuts was reduced to levels between about 8 to 25% by hydraulic or screw pressing prior to exposure to steam passage through the extruder.

From the foregoing description, one skilled in the art can easily ascertain the essential characteristics of this invention, and without departing from the spirit and scope thereof, can made various changes and modifications of the invention to adapt it to various usages and conditions. Consequently, such changes and modifications are properly, equitably, and intended to be, within the full range of equivalence of the following claims.

TABLE I

Oxidation of full-fat peanut flakes during storage at 100° F as influenced by steaming whole shelled peanuts from which they were derived.

| Steaming Temperature ° F | Steaming Time Minutes | Peroxide value of peanut flakes Meq peroxide oxygen/Kg oil | | | | |
|---|---|---|---|---|---|---|
| | | Initial | 8 wk | 16 wk | 24 wk | 32 wk |
| 212 | 2 | 1.8 | 36.9 | 34.9 | 79.0 | 256.6 |
| " | 5 | 4.8 | 12.8 | 26.0 | 97.2 | 187.2 |
| " | 10 | 4.7 | 10.5 | 23.6 | 89.8 | 165.4 |
| " | 15 | 4.3 | 6.9 | 8.3 | 57.0 | |
| " | 20 | 3.3 | 4.3 | 4.2 | 10.3 | 18.7 |
| " | 30 | 3.5 | 2.5 | 2.7 | 10.6 | 13.6 |

*Peroxide values are in milliequivalents of peroxide oxygen/1,000 grams of extracted oil.

TABLE II

Peroxide values of steamed and dried whole shelled peanuts after storage for 4 weeks at 100° F

| Steaming Conditions | | Peroxide Values | |
|---|---|---|---|
| Time Min. | Temperature ° F | Weeks | |
| | | 0 | 4 |
| 0 | — | 0 | 0 |
| 10 | 212 | 1.6 | 16.4 |
| 20 | " | 1.7 | 27.1 |
| 30 | " | 4.8 | 63.6 |
| 70 | " | 5.9 | 55.9 |
| 10 | 230 | 0 | 78.4 |
| 20 | " | 0 | 66.6 |
| 30 | " | 0 | 60.0 |
| 70 | " | 0 | 19.4 |

TABLE III

Effect of heat treatments on peroxidase and lipoxygenase activities in water extracts of peanut cotyledons

| Heat treatment (° F) | Time (min) | Enzyme activity (absorption units/g defatted flour) | |
|---|---|---|---|
| | | Peroxidase[a] | Lipoxygenase[b] |
| None | 0 | 16.8 | 25.2 |
| 225 (dry) | 60 | 8.1 | 1.8 |
| 212 (steam) | 2 | 5.9 | 0 |
| 212 (steam) | 6 | 1.3 | 0 |
| 212 (steam) | 8 | 0.5 | 0 |
| 212 (steam) | 20 | 0.3 | 0 |
| 212 (steam) | 30 | 0.2 | 0 |

[a]Absorbance units/g = $\dfrac{\text{absorbance at 430 nm}}{\dfrac{\text{g defatted flour}}{\text{ml H}_2\text{O for extracted}}} \times$ ml extract used in assay

[b]Absorbance units/g = $\dfrac{\text{absorbance at 480 nm}}{\dfrac{\text{g defatted flour}}{\text{ml H}_2\text{O for extraction}}} \times$ ml extract used in assay

TABLE IV

Hydroperoxide reduction activity in peanuts steamed at 212° F

| Sample | Steaming time of raw peanuts (minutes) | Peroxide value[a] |
|---|---|---|
| A (ground roasted peanuts) | 0 | 78.2 |
| B (raw peanuts) | 2 | 0 |
| 10g A + 2g flour[b] | 2 | 5.4 |
| 10g A + 2g flour | 6 | 23.4 |
| 19g A + 2g flour | 8 | 26.5 |
| 10g A + 2g flour | 20 | 60.0 |
| 10g A + 2g flour | 30 | 78.0 |

[a]Milliequivalents of peroxide oxygen/1000 grams of extracted oil determined 24 hours after blending peanut samples
[b]Prepared by hexane extraction of steamed peanuts

TABLE V

Effect of precooking finely ground peanut-water mixture on rate of oxidation of oil in peanut flakes during storage in air at 100° F.

| Precooking Conditions | | Peroxide Values[a] | | | | | | |
|---|---|---|---|---|---|---|---|---|
| Temperature ° F | Time Min. | Weeks of Storage at 100° F | | | | | | |
| | | 0 | 8 | 16 | 24 | 32 | 40 | 48 |
| 212° F | 20 | 7.8 | 7.6 | 7.0 | 13.6 | 16.1 | 34.2 | 75.6 |
| " | 40 | 4.7 | 6.1 | 5.9 | 8.6 | 13.5 | 28.0 | 63.6 |

-continued

| Precooking Conditions | | Peroxide Values[a] | | | | | | |
|---|---|---|---|---|---|---|---|---|
| Temperature °F | Time Min. | Weeks of Storage at 100° F | | | | | | |
| | | 0 | 8 | 16 | 24 | 32 | 40 | 48 |
| " | 60 | 3.3 | 4.7 | 4.5 | 11 8.8 | 14.6 | 13.5 | 36.6 |
| 240 | 20 | 6.5 | 10.0 | 10.8 | 21.1 | 45.2 | 64.1 | 101.0 |
| " | 40 | 8.6 | 8.6 | 8.4 | 13.5 | 36.8 | 33.4 | 63.5 |
| " | 60 | 3.1 | 5.1 | 4.9 | 6.7 | — | 15.6 | 29.0 |
| — | 11 0 | 9.6 | 12.3 | 16.9 | 45.3 | 59.1 | 393.2 | 673.5 |

[a]Milliequivalents of peroxide oxygen per 1000 grams of oil.

TABLE VI

Effect of antioxidants on the rate of oxidation of oil in peanut flakes during storage in air at 100° F

| Antioxidant | Precooking Conditions | | Peroxide Value[a] | | | | | | |
|---|---|---|---|---|---|---|---|---|---|
| | Time Min. | Temperature °F | 0 | 8 | 16 | 24 | 32 | 40 | 48 |
| None | 0 | — | 9.6 | 12.3 | 16.9 | 45.3 | 59.1 | 393.2 | 673.5 |
| BHA + citric acid[b] | 0 | — | 11.0 | 14.0 | 26.4 | 36.8 | 99.0 | 115.4 | 426.4 |
| BHA + citric acid | 0 | — | 11.9 | 15.4 | 19.2 | 32.9 | 108.8 | 298.3 | 394.8 |
| None | 20 | 240 | 6.5 | 10.0 | 10.8 | 21.1 | 45.2 | 64.1 | 101.0 |
| BHA + citric acid[b] | 20 | 240 | 4.0 | 3.3 | 7.1 | 9.1 | 6.3 | — | 6.1 |
| BHA + citric acid[c] | 20 | 240 | 4.7 | 6.6 | 8.7 | 7.4 | 7.0 | — | 13.3 |

[a]Milliequivalents of peroxide oxygen per 1000 grams of extracted oil.
[b]0.01% BHA + 0.01% citric acid based on weight of ground peanuts.
[c]0.01% BHA + 0.01% citric acid based on weight of peanut oil.

TABLE VII

Comparison of several treatments on the rate of oxidation of oil in peanut flakes during storage in air at 100° F

| Antioxidant and Synergist | Precook Treatment | | Peroxide Value[a] | | | | | |
|---|---|---|---|---|---|---|---|---|
| | °F | Min. | Weeks of Storage at 100° F | | | | | |
| | | | 0 | 12 | 16 | 20 | 24 | 28 |
| None | 240 | 20 | 5.3 | 17.8 | 25.2 | 40.2 | 44.2 | 61.6 |
| BHA + citric acid | " | " | 5.3 | 15.7 | 20.0 | 25.4 | 19.2 | 26.6 |
| Citric acid | " | " | 5.5 | 13.3 | 22.8 | 23.3 | 25.4 | 26.8 |
| Propyl gallate + citric acid | " | " | 5.1 | 10.7 | 14.9 | 15.1 | 16.4 | 22.7 |
| BHA + EDTA | " | " | 5.0 | 9.9 | 15.9 | 16.8 | 20.7 | 23.2 |
| BHT + citric acid | " | " | 6.7 | — | 7.9 | 13.9 | 14.1 | 29.5 |
| EDTA | " | " | 5.5 | — | 9.6 | 13.2 | 16.0 | 15.3 |
| TBHQ + citric acid | " | " | 5.1 | 7.2 | 13.8 | 8.8 | 9.6 | 17.7 |

[a]Milliequivalents of peroxide oxygen per 1000 grams of extracted oil.

TABLE VIII

Oxidation of oil in partially defatted precooked peanut flakes

| Oil in flakes % | Storage temperature °F | Peroxide Value[a] | | | | |
|---|---|---|---|---|---|---|
| | | 0 wks | 8 wks | 16 wks | 20 wks | 24 wks |
| 25.5 | | 6.1 | | 10.2 | | 8.9 |
| 30.3 | 100 | 7.0 | 7.4 | 7.8 | 8.5 | 8.9 |
| 30.3 | 118 | 7.0 | 9.7 | 8.9 | 9.9 | |

[a]Milliequivalents of peroxide oxygen per 1000 grams of extracted oil.

What is claimed is:

1. A process for making precooked dehydrated peanut food ingredients which comprises coarsely grinding shelled peanuts without releasing oil, and without reducing the moisture content of the peanuts, adding a sufficient amount of water to the coarsely ground peanuts to form a slurry and prevent congealment to a semisolid when the slurry is disintegrated, disintegrating the slurry in such a manner that the cellular tissue is torn into shreds thereby releasing oil, water soluble protein and carbohydrates to form an emulsion of oil with the water, and a suspension of solids, heating the emulsion-suspension at a temperature of about 200° F for 30 minutes up to about 325° F for about 5 seconds to increase the consistency as the protein coagulates and starch is gelatinized, and to stabilize the oil against oxidation, and drying the resultant material thereby providing a slightly coarse texture in the dehydrated food ingredient.

2. The process according to claim 1 in which the peanuts are steamed to inactivate lipoxygenase prior to grinding.

3. The process according to claim 1 wherein before the step of grinding, the protein to oil ratio of precooked dehydrated food ingredients made from peanuts is adjusted and the shelf life of said dehydrated food ingredients is increased, comprising the step of removing part of the oil content of peanuts by mechanical means.

4. The process according to claim 1 wherein before the step heating essentially all of the oil of the peanuts is removed by solvent extraction.

5. Peanut ingredient made in accordance with the process of claim 1 used as extender to natural food products, consisting of precooked dehydrated peanut flakes, granules, flour, or other physical forms and at least one additive in a amount ranging from 0.01 to 0.02 weight percent of the peanut ingredients for extending the shelf life of said peanut ingredient.

6. Food products containing a substantial amount of precooked, dehydrated peanut derived flakes, granules, flour, made in accordance with the process of claim 8 having various levels of protein and oil contents ranging from about 27 to 60% by weight of protein and from about 0 to 50% by weight of oil.

7. The process of claim 1 whereby said step of dehydration comprises spray drying.

8. The process of claim 1 whereby said step of dehydration comprises drum drying.

9. The method according to claim 1 wherein prior to the step of drying, the method comprising adding at least one or more of the following proteins carbohydrates, cereal flours, legume flours, non-fat milk solids, amino acids, vitamin, and minerals to the peanut-water mixture.

10. The process according to claim 1 which comprises cooling the heated suspension-emulsion and then adding a heat coagulable material which, upon dehydration coagulates and provides additional textural strength.

11. The process according to claim 10, wherein the percentage of heat coagulable material added is between 3 to 5% weight of the ground peanuts, and the heat coagulable material is albumen.

12. The process according to claim 10, wherein the percentage of heat coagulable material added between 3 to 5% weight of the ground peanuts, and the heat coagulable material is starch.

13. A process for producing a precooked peanut flour having good storage stability properties by first removing part of the oil from shelled peanuts by mechanical pressure to reduce the oil level to about 6 to 30%, disintegrating the partially defatted peanut material into coarse particle sizes by grinding or into flakes by passage between rollers, exposing the partially defatted peanut material to steam for about 2 to 5 minutes to achieve a temperature of about 90° - 212° F and a moisture content of about 20%, passing the streamed peanut material into a screw-type extruder and heating the peanut material until it attains a temperture of from about 230° to 300° F during a residence time of about 1 to 5 minutes, and drying to a moisture level of about 2 to 5%.

14. A process of producing essentially flavorless shelf stable precooked dehydrated peanut food ingredients comprising combining one part of finely ground raw blanched peanuts with between ⅛ to ¼ parts of water to form a mixture, adding up to 0.01% by weight of ethylene diamine tetraacetic acid and 0.01% of tertiary butyl hydroquenone to the mixture, heating the mixture between 200° and 300° F in a swept surface heat exchanger, passing the mixture through a die to form a thin stratum, and dehydrating the thin stratum.

* * * * *